(12) United States Patent
Hurley

(10) Patent No.: US 7,673,177 B2
(45) Date of Patent: Mar. 2, 2010

(54) CIRCUIT AND METHOD FOR PROVIDING PCB POWER-ON SELF TEST CAPABILITY FOR PERIPHERAL DEVICES

(75) Inventor: William M. Hurley, Wylie, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1707 days.

(21) Appl. No.: 10/611,272

(22) Filed: Jul. 1, 2003

(65) Prior Publication Data

US 2005/0015670 A1 Jan. 20, 2005

(51) Int. Cl.
*G06F 11/00* (2006.01)

(52) U.S. Cl. .......................................................... 714/30

(58) Field of Classification Search .................... 714/30, 714/31, 36
See application file for complete search history.

(56) References Cited

U.S. PATENT DOCUMENTS

| | | | | |
|---|---|---|---|---|
| 4,308,615 A | * | 12/1981 | Koegel et al. .................. | 714/46 |
| 4,575,792 A | * | 3/1986 | Keeley ........................... | 714/42 |
| 4,878,168 A | * | 10/1989 | Johnson et al. ................. | 714/27 |
| 4,942,556 A | * | 7/1990 | Sasaki et al. ................... | 365/200 |
| 4,967,387 A | * | 10/1990 | Shibasaki et al. .............. | 702/120 |
| 5,072,450 A | * | 12/1991 | Helm et al. .................... | 714/723 |
| 5,073,891 A | * | 12/1991 | Patel .............................. | 714/720 |
| 5,161,162 A | * | 11/1992 | Watkins et al. ................. | 714/43 |
| 5,222,068 A | * | 6/1993 | Burchard ........................ | 714/727 |
| 5,228,139 A | * | 7/1993 | Miwa et al. .................... | 714/27 |
| 5,276,833 A | * | 1/1994 | Auvinen et al. ............... | 711/105 |
| 5,363,380 A | * | 11/1994 | Shinohara ...................... | 714/25 |
| 5,390,325 A | * | 2/1995 | Miller ............................ | 714/38 |
| 5,423,050 A | * | 6/1995 | Taylor et al. ................... | 714/31 |
| 5,596,537 A | * | 1/1997 | Sukegawa et al. ............. | 365/201 |
| 5,704,033 A | * | 12/1997 | Park .............................. | 714/30 |
| 5,822,228 A | * | 10/1998 | Irrinki et al. ................... | 714/718 |
| 6,000,040 A | * | 12/1999 | Culley et al. ................... | 714/31 |
| 6,003,142 A | * | 12/1999 | Mori .............................. | 714/30 |

* cited by examiner

*Primary Examiner*—Robert Beausoilel
*Assistant Examiner*—Elmira Mehrmanesh

(57) ABSTRACT

A circuit and method for providing a power-on self test capability for peripheral devices that allows direct testing of address-line data. The preferred embodiment includes a multiplexer circuit that allows the read address line outputs of a microprocessor to be directly returned to the data inputs of the microprocessor, thus providing a direct verification of the integrity of the read-address connection.

20 Claims, 3 Drawing Sheets

CIRCUIT AND METHOD FOR PROVIDING PCB POWER-ON SELF TEST CAPABILITY FOR PERIPHERAL DEVICES

TECHNICAL FIELD OF THE INVENTION

The present invention is directed, in general, to device testing and, more specifically, to power-on device self-testing of peripheral devices.

BACKGROUND OF THE INVENTION

Virtually all reasonably complex embedded electrical designs consist of microprocessors and application-specific circuitry. In this model, the microprocessors typically run power-on-self-test (POST) code to test device functionality when powered on. Unfortunately, microprocessors typically have difficulty detecting electrical faults for application-specific circuitry connected to the processor bus.

In conventional devices, address-line testing algorithms generally include writing data to various locations in a device, then reading the data from the address locations to verify that the transfers were successful. Careful selection of the address locations results in high or complete address-line coverage. The algorithm works well for devices, such as random-access memory (RAM), in which all locations are fully readable/writable. Unfortunately, embedded designs typically consist of many application-specific peripheral devices whose memory map consists primarily of registers that control configuration and provide status of the device, and are not fully readable/writable.

In these devices, the only option is to look through a memory map and find a few registers that the processor can operate on or read from, to test whether the specific address lines are connected. Typically, this reduces coverage to just a few of the address lines connected to a device. In addition, it requires significant up-front work to determine which bits of which registers can be accessed for testing.

FIG. 3 shows a block diagram of a conventional microprocessor read operation. Here, the microprocessor 310 sends an address read command to an internal register 330 of embedded peripheral device 320. Internal register 330 returns a corresponding result to microprocessor 310. Based on the result, microprocessor 310 can infer whether or not the register 330 received the correct address.

As described above, however, this test can only provide an inferential result, and may not be entirely reliable.

There is, therefore, a need in the art for a circuit and method for providing a power-on self-test capability for peripheral devices that allows direct testing of address-line data.

SUMMARY OF THE INVENTION

The preferred embodiment provides a circuit and method for providing a power-on self test capability for peripheral devices that allows direct testing of address-line data. The preferred embodiment includes a multiplexer circuit that allows the read address line outputs of a microprocessor to be directly returned to the data inputs of the microprocessor, thus providing a direct verification of the integrity of the read-address connection.

To address the above-discussed deficiencies of the prior art, it is a primary object of the present invention to provide an electronic device that allows direct testing of address-line data. According to an advantageous embodiment of the present invention, the electronic device comprises: 1) a microprocessor; 2) an embedded device, the embedded device having at least one addressable register connected to be addressed by, written to, and read from by the microprocessor; and 3) a multiplexer circuit having selectable first and second modes of operation. When the multiplexer is in the first mode of operation, then an address bus output of the microprocessor is connected to a data bus input of the microprocessor. When the multiplexer is in the second mode of operation, then an output of the addressable register is connected to the data bus input of the microprocessor.

According to one embodiment of the present invention, the first mode of operation is used to test the address bus.

According to another embodiment of the present invention, the second mode of operation is for normal operation of the internal register.

According to still another embodiment of the present invention, the first mode of operation is selected using an external select pin.

According to yet another embodiment of the present invention, the first mode of operation is selected using an internal mode select register.

According to a further embodiment of the present invention, the first mode of operation is selected during a power-on-self-test routine.

According to a still further embodiment of the present invention, the multiplexer circuit is internal to the embedded device.

The foregoing has outlined broadly the features and technical advantages of the present invention so that those skilled in the art may better understand the detailed description of the invention that follows. Additional features and advantages of the invention will be described hereafter that form the subject of the claims of the invention. Those skilled in the art will appreciate that the conception and the specific embodiment disclosed may be used as a basis for modifying or designing other structures for carrying out the purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
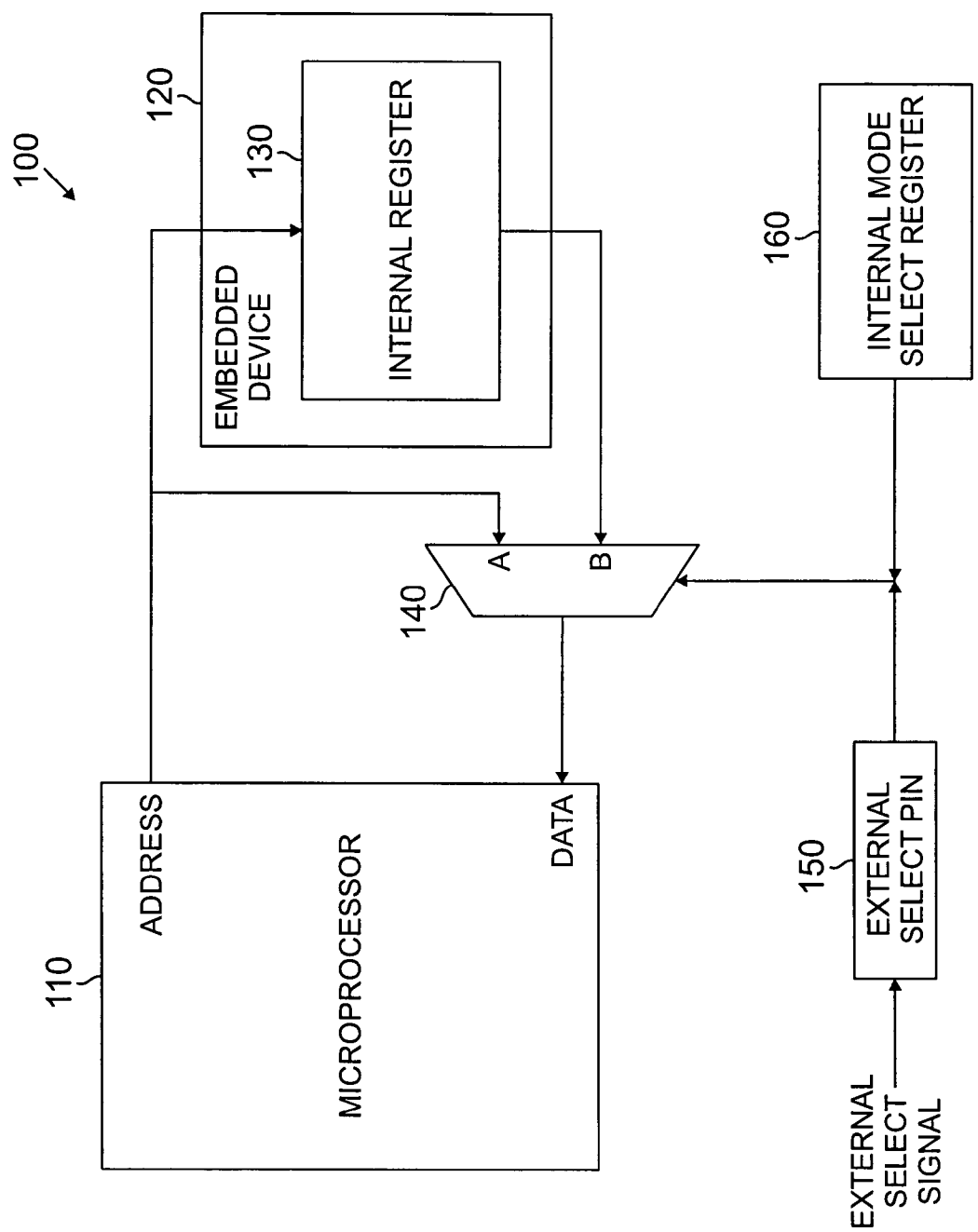
FIG. 1 is a block diagram of a system including the address check function according to the principles of the present invention.
Figure 2:
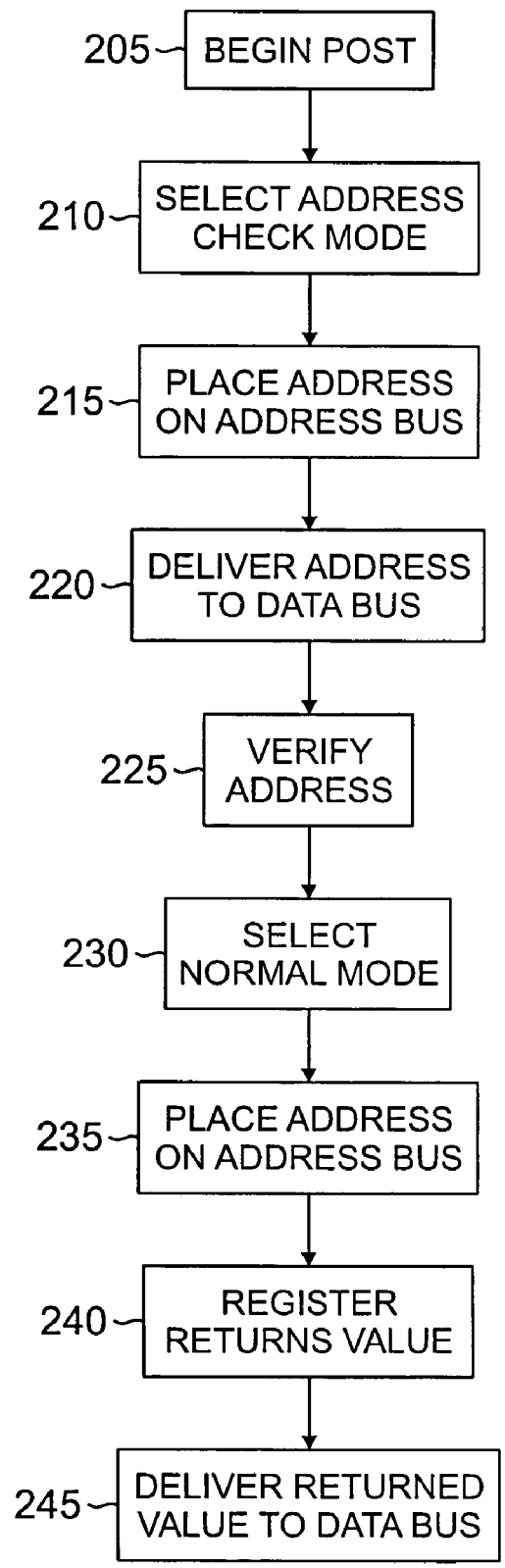
FIG. 2 is a flow diagram illustrating the operation of the address check function according to the principles of the present invention.
Figure 3:
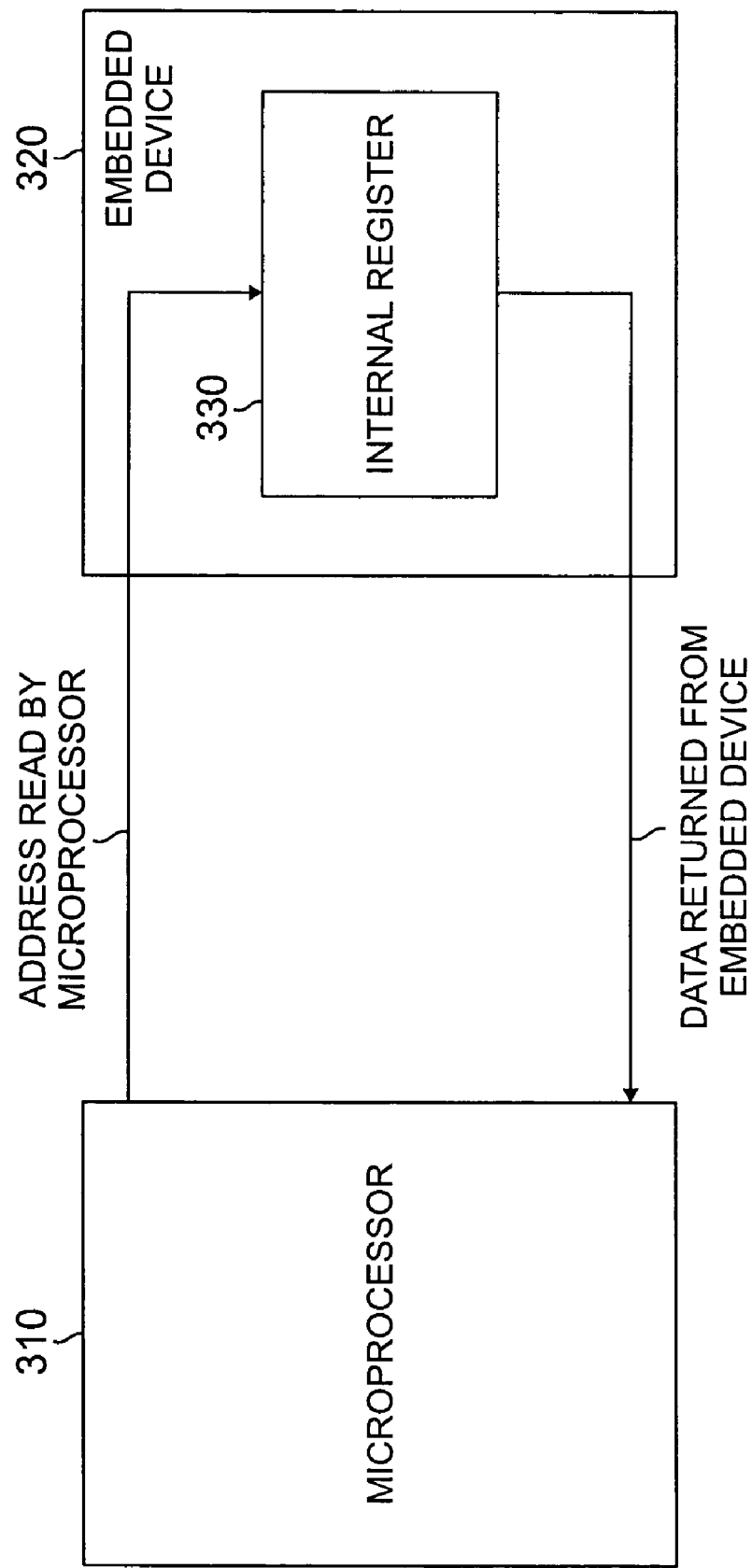
FIG. 3 is a block diagram of a conventional microprocessor read operation.

FIGS. 1 through 3, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment provides a circuit and method for providing a power-on self test (POST) capability for peripheral devices that allows direct testing of address-line data. The preferred embodiment includes a multiplexer circuit that allows the read address line outputs of a microprocessor to be directly returned to the data inputs of the microprocessor, thus providing a direct verification of the integrity of the read-address connection.

The preferred embodiment provides additional paths within an embedded device in order for the controlling processor to directly detect address line faults. Specifically, the address check mode of operation is enabled through a controlling mechanism from either an internal register or an external pin.

When enabled, all reads of the embedded device return not the internal register data as is standard, but instead returns the address that is being read. This function provides the processor direct visibility of the address lines and, therefore, immediate detection of address line faults.

The simplicity of detecting address line fault, using the system and method of the preferred embodiment, then allows for an extremely simple POST algorithm that provides 100% address line fault coverage with very little software coding time and no need for long investigations to attempt to infer faults from standard data line values. Simply reading from every address, and comparing the value returned with the address read will provide 100% coverage. Algorithms that require simply one read per address bit are possible if POST speed is critical.

Writes to the embedded device are allowed to occur as normal for configuration and for control of the "address check" mode selection, in an embodiment wherein the mode selection is made from internal registers. Note that when in address check mode, no other state of the device is affected, so normal operation of the device can still occur.

FIG. 1 depicts a block diagram of system 100, which including the address check function of the preferred embodiment of the present invention. Microprocessor-embedded device system 100 comprises microprocessor 110, embedded device 120, multiplexer (MUX) 140, and internal mode select register 160. Embedded device 120 comprises internal register 130, among other things.

Microprocessor 110 is capable of reading data from, and writing data to, internal register 130 of embedded device 120.

The address bus of microprocessor 110 is coupled to a first input channel of multiplexer 140 (i.e., channel A) and to the address inputs of internal register 130. The data outputs of internal register 130 are coupled to the second input channel of multiplexer 140 (i.e., channel B).

The output of multiplexer 140 is coupled to the data bus of microprocessor 110. The channel select input of multiplexer 140 is coupled to external select pin 150 or to internal mode select register 160, or both.

As FIG. 1 illustrates, either internal mode selection register 160 or a signal on external select pin 150 may select one of the two input channels of multiplexer 140. When the address check mode of system 100 is disabled, multiplexer 140 simply passes data from internal registers (e.g., internal register 130) of embedded device 120 to the data bus of microprocessor 110 and system 100 operates normally.

However, when the address check mode is enabled, the address being read by microprocessor 110 is routed directly to the data bus returned from embedded device 120 via multiplexer 140 and microprocessor 110 has direct visibility of the address lines of embedded device 120.

If the address width is larger than the data width, multiplexer 140 may use additional input channels for the excess address bits, so that different portions of the address bus are visible at any time. A test with one multiplexer setting is performed, followed by a test with a second multiplexer setting, and so forth. Thus, the same level of coverage is achieved for wide address buses.

Using internal mode select register 160 for mode selection implies that internal mode select register 160 can be accessed even if an address line fault has occurred. Thoughtful placement of internal mode select register 160 in the memory map or placement of internal mode select register 160 in several strategic locations can provide a high probability of access.

Use of external select pin 150 for mode selection provides the best coverage, but requires that a general-purpose I/O line from microprocessor 110 or a similar device be available for control of external select pin 150.

FIG. 2 is a flow diagram illustrating the operation of the address check function according to the principles of the present invention. Here, microprocessor 110 first begins a power-on-self-test (POST) operation (step 205). It will be understood by those skilled in the art that the test mode described herein can be used outside of a POST operation.

Next, multiplexer 140 is placed in the address check mode of operation, either by the external select signal on external select pin 150 or by internal mode select register 160 (step 210). When microprocessor 110 delivers an address on the address bus (step 215), multiplexer 140 delivers that address from the channel A input directly to the data bus of microprocessor 110 (step 220). Microprocessor 110 then verifies the address data for faults (step 225).

Next, multiplexer 140 is placed in the normal mode of operation (step 230). When microprocessor 110 delivers an address on the address bus (step 235), internal register 130 returns a value (step 240), which multiplexer 140 delivers to the data bus of microprocessor 110 (step 245).

Those skilled in the art will recognize that, for simplicity and clarity, the full structure and operation of all data processing systems suitable for use with the present invention is not being depicted or described herein. Instead, only so much of a device as is unique to the present invention or necessary for an understanding of the present invention is depicted and described. The remainder of the construction and operation of the disclosed devices may conform to any of the various current implementations and practices known in the art.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS.

What is claimed is:

1. An electronic device comprising:
   a microprocessor;
   an embedded device, the embedded device having at least one addressable register connected to be addressed by, written to, and read from by the microprocessor; and
   a multiplexer circuit having selectable first and second modes of operation,
   wherein when the multiplexer is in the first mode of operation, then an address bus output of the microprocessor is connected to a data bus input of the microprocessor, and
   wherein when the multiplexer is in the second mode of operation, then an output of the addressable register is connected to the data bus input of the microprocessor.

2. The electronic device of claim 1, wherein the first mode of operation is used to test the address bus.

3. The electronic device of claim 1, wherein the second mode of operation is for normal operation of the internal register.

4. The electronic device of claim 1, wherein the first mode of operation is selected using an external select pin.

5. The electronic device of claim 1, wherein the first mode of operation is selected using an internal mode select register.

6. The electronic device of claim 1, wherein the first mode of operation is selected during a power-on-self-test routine.

7. The electronic device of claim 1, wherein the multiplexer circuit is internal to the embedded device.

8. A controllable peripheral device, comprising:
   an address bus
   a data bus,
   at least one addressable register operatively connected to the address bus and the data bus; and
   a multiplexer circuit having selectable first and second modes of operation,
   wherein when the multiplexer is in the first mode of operation, then the address bus is operatively connected to the data bus, and
   wherein when the multiplexer is in the second mode of operation, then an output of the addressable register is operatively connected to the data bus.

9. The controllable peripheral device of claim 8, wherein the first mode of operation is used to test the address bus.

10. The controllable peripheral device of claim 8, wherein the second mode of operation is for normal operation of the internal register.

11. The controllable peripheral device of claim 8, wherein the first mode of operation is selected using an external select pin.

12. The controllable peripheral device of claim 8, wherein the first mode of operation is selected using an internal mode select register.

13. The controllable peripheral device of claim 8, wherein the first mode of operation is selected during a power-on-self-test routine.

14. A method, comprising:
    selecting a first mode of operation or a second mode of operation;
    placing address data on the address bus of a microprocessor;
    in the first mode of operation, then placing the address data on the data bus of the microprocessor; and
    in the second mode of operation, then placing output data, from an internal register corresponding to the address data, on the data bus of the microprocessor.

15. The method of claim 14, wherein the first mode of operation is used to test the address bus.

16. The method of claim 14, wherein the second mode of operation is for normal operation of the internal register.

17. The method of claim 14, wherein the first mode of operation is selected using an external select pin.

18. The method of claim 14, further comprising selecting the first mode of operation using an internal mode select register.

19. The method of claim 14, wherein the first mode of operation is selected during a power-on-self-test routine.

20. The method of claim 14, wherein a multiplexer circuit is used to place data on the address bus.

* * * * *